United States Patent
Eisele et al.

(10) Patent No.: US 9,925,670 B2
(45) Date of Patent: Mar. 27, 2018

(54) METHOD FOR HANDLING FLEXIBLE MAT-LIKE WORKPIECES

(71) Applicant: J. Schmalz GmbH, Glatten (DE)

(72) Inventors: Thomas Eisele, Alpirsbach-Peterzell (DE); Harald Kuolt, Deilingen (DE); Marcus Eberle, Lauterburg (DE); Walter Dunkmann, Baden-Baden (DE); Aline Defranceski, Horb a.N. (DE); Florian Fritz, Tuebingen (DE); Hermann Reinisch, Sulz a.N./Hopfau (DE)

(73) Assignee: J. Schmalz GmbH, Glatten (DE)

( * ) Notice: Subject to any disclaimer, the term of this patent is extended or adjusted under 35 U.S.C. 154(b) by 221 days.

(21) Appl. No.: 14/727,959

(22) Filed: Jun. 2, 2015

(65) Prior Publication Data
US 2015/0352796 A1    Dec. 10, 2015

(30) Foreign Application Priority Data

Jun. 5, 2014   (DE) .................. 10 2014 210 748

(51) Int. Cl.
*B29C 70/54*   (2006.01)
*B25J 15/00*   (2006.01)
*B25J 15/06*   (2006.01)

(52) U.S. Cl.
CPC ....... *B25J 15/0052* (2013.01); *B25J 15/0033* (2013.01); *B25J 15/0061* (2013.01); *B25J 15/0616* (2013.01); *B29C 70/54* (2013.01)

(58) Field of Classification Search
CPC ............... B15J 15/0052; B25J 15/0061; B25J 15/0033; B25J 15/0616; B29C 70/54
See application file for complete search history.

(56) References Cited

U.S. PATENT DOCUMENTS 3,720,433 A   3/1973   Rosfelder
3,775,932 A   12/1973   Jeney
(Continued)

FOREIGN PATENT DOCUMENTS

CN   103201067 A     7/2013
DE   202007013673 U1  2/2009
(Continued)

OTHER PUBLICATIONS

Communication dated Apr. 15, 2016 enclosing the European Search Report dated Apr. 7, 2016 issued by the European Patent Office for European Patent Application No. 15168163.
(Continued)

*Primary Examiner* — Nahida Sultana
(74) *Attorney, Agent, or Firm* — Howard & Howard Attorneys PLLC

(57) ABSTRACT

A method for the handling of flexible and/or mat-like workpieces (30, 30a) with a holding device (10) comprising the steps of: picking up the workpiece (30, 30a) from an initial configuration with activated gripping devices (18); and displacing the gripping devices (18) relative to each other to deform the workpiece (30, 30a) into a desired freeform, further wherein the holding force before or during the displacement of the gripping devices (18) is reduced on each gripping device (18) so that the first sections (34) of the workpiece (30, 30a) during its deformation slide along the contact surface (20) and the second sections (36) of the workpiece (30, 30a) are fixed by the gripping devices (18) on the bearing surface (20).

7 Claims, 4 Drawing Sheets

(56) References Cited

U.S. PATENT DOCUMENTS

| | | | |
|---|---|---|---|
| 3,837,782 A | 9/1974 | Meissner et al. | |
| 3,955,843 A | 5/1976 | Ottenhues et al. | |
| 4,651,659 A * | 3/1987 | Bernardon | B25J 15/0616 112/308 |
| 7,717,482 B2 | 5/2010 | Iwasaki | |
| 9,630,316 B2 * | 4/2017 | Konolige | B25J 9/1612 |
| 2001/0045755 A1 | 11/2001 | Schick et al. | |
| 2011/0240441 A1 * | 10/2011 | Stauber | B65H 5/085 198/470.1 |
| 2011/0272249 A1 * | 11/2011 | Berni | B65H 29/003 198/612 |
| 2012/0142508 A1 * | 6/2012 | Ziliani | B21D 39/048 483/1 |
| 2012/0181804 A1 | 7/2012 | Schmidt et al. | |
| 2013/0038077 A1 * | 2/2013 | Hummeler | B65B 35/38 294/183 |
| 2013/0189019 A1 * | 7/2013 | Kotula | B25J 15/0061 403/84 |
| 2013/0220155 A1 * | 8/2013 | Kupershtoch | B41F 21/05 101/409 |
| 2014/0199153 A1 | 7/2014 | Reinhold et al. | |
| 2014/0255141 A1 * | 9/2014 | Koure | B65B 23/02 414/796.2 |
| 2014/0375072 A1 * | 12/2014 | Cho | B25J 15/0061 294/188 |
| 2015/0298320 A1 | 10/2015 | Eisele et al. | |
| 2015/0352723 A1 * | 12/2015 | Nissler | B65G 47/915 414/737 |
| 2015/0352726 A1 * | 12/2015 | Harter | B65G 47/91 294/185 |
| 2015/0360371 A1 * | 12/2015 | Harter | B25J 15/0616 294/186 |
| 2015/0367517 A1 | 12/2015 | Eisele et al. | |
| 2016/0018587 A1 * | 1/2016 | Koraishy | G02B 6/0065 156/708 |
| 2016/0339590 A1 * | 11/2016 | Lin | B25J 15/0061 |

FOREIGN PATENT DOCUMENTS

| | | |
|---|---|---|
| DE | 102011106214 A1 | 12/2012 |
| DE | 102012019958 A1 | 4/2013 |
| DE | 102011056029 A1 | 6/2013 |
| DE | 102012003094 A1 | 8/2013 |
| DE | 102013201765 A1 | 8/2014 |
| EP | 0429901 A1 | 6/1991 |
| EP | 2042277 A1 | 4/2009 |
| EP | 2386512 A1 | 11/2011 |
| EP | 2557043 A1 | 2/2013 |
| WO | 2010051650 A1 | 5/2010 |
| WO | 2013055211 A1 | 4/2013 |

OTHER PUBLICATIONS

Communication dated Apr. 22, 2016 enclosing the European Search Report dated Apr. 14, 2016 issued by the European Patent Office for European Patent Application No. 15168164.
Non-Final Office Action dated Jun. 7, 2016 for U.S. Appl. No. 14/727,948.
Communication issued by the European Patent Office dated Dec. 5, 2017 for European Application No. 15168163.
First Office Action for Chinese Patent Application No. 201510303333.6 dated Jan. 23, 2018.

* cited by examiner

METHOD FOR HANDLING FLEXIBLE MAT-LIKE WORKPIECES

CROSS-REFERENCE TO RELATED APPLICATIONS

The present application claims priority to and all the benefits of German Patent Application No. 10 2014 210 748.2, filed on Jun. 5, 2014, which is hereby expressly incorporated herein by reference in its entirety.

BACKGROUND

Technical Field

The invention relates to a method for handling of flexible and/or mat-like workpieces.

Description of the Related Art

Workpieces are often handled with a holding device comprising a plurality of gripping devices movable relatively to each other, whose spatial arrangement can be adapted to a desired total free-form surface. Such holding devices can be used when handling flexible or pliable and/or two-dimensional and/or mat-like workpieces such as semi-finished products (i.e. intermediate products in processing steps of a product), textiles, fiber mats, foils or flexible sheets. Thus, for example, in the production of fiber composite parts made of layers of flexible fiber mats the cut sheet-like material pieces are taken from a generally flat initial configuration and must be transferred to a usually three-dimensional curved target shape.

The target form is for example defined by a workpiece carrier, in which, for example, further processing is to take place. In the series process, this must be carried out precisely, reproducibly and reliably. Complex holding devices constructed with individually driven tappets can thereby prove to be sluggish, slow and expensive. Holding devices for storing pieces of material in a workpiece carrier, such as the one known from DE 10 2011 056 029 A1 may cause high stresses in the material. This can cause damage to the material so that a reliable operation cannot be guaranteed.

SUMMARY OF THE INVENTION

One of the objects of the present invention is to bring the workpieces (e.g. flat and/or flexible materials) into a desired freeform in a controlled manner.

To this end and pursuant to the method of the present invention, the workpiece is retrieved from an initial configuration, which may be in particular flat, and the gripping devices are displaced relative to each other to deform the workpiece into a desired freeform. The holding force before and/or during the displacement of the gripping devices is reduced or inactivated in such a manner that first sections of the workpiece during its deformation slide along the bearing surface and the second sections of the workpiece are fixed by means of the gripping devices on the bearing surface of individual gripping devices.

During the retrieving of the workpiece, in particular at least some of the gripping devices, preferably all gripping devices, are activated. By the targeted forming of the first and second sections, different holding forces can be introduced into the shaping of materials, in particular fiber-reinforced semi-finished products, so that a contour-accurate and reproducible deformation can be achieved. In this case, defined regions of the workpiece, namely the second sections of the workpiece, are fixed by the gripping means against the bearing surface, and other sections of the workpiece, namely the first sections of the workpiece, are sliding along individual zones of the contact surface by reduced holding forces. In this way, expansions and compressions, which are needed to achieve the desired contour, are specifically allowed.

In other words, a targeted "non-holding" of individual zones of the workpiece, in particular the first sections of the workpiece, is performed. The sliding of certain areas of the total formed gripping surface of the holding device makes possible a bending of the total formed gripping surface.

Generally speaking, contact sections of the workpiece in its initial configuration are abutting to at least some of the gripping device. Preferably, the force exerted by this gripping device before and/or during the displacement is reduced as a function of the length of the desired sliding pathway, which the respective contact section should cover by sliding along the contact surface during the deformation into the desired freeform.

The holding forces are preferably introduced such that the respective contact sections slide by a distance that can be predetermined by controlling the holding forces. This provides additional degrees of freedom. For example, different shapes of the workpiece and different resultant sliding end states can be realized for a given displacement of the gripping devices by different settings of the holding forces. In addition, depending on the setting of the holding forces, material stresses can be introduced into the workpiece during the deformation.

Specifically, sliding a long way can be achieved for a particular contact section of the workpiece by reducing the holding force first applied to this contact section as a function of the length of the desired sliding path during the deformation. In particular, a reduction of the holding force proportional to the desired sliding path is conceivable.

The gripping devices may be formed by vacuum suction, electro-adhesive gripping devices or a combination of gripping principles, in particular a needle gripper. Advantageously, the gripping devices can be activated and deactivated independently from each other. Thus, the applied holding forces are adjustable. In this way, it is possible to selectively act on selected sections of the total gripping surface of the holding device provided by the gripping devices with a bigger or a smaller holding force. This allows to avoid local stress peaks in the flexible workpiece material. The holding forces are adjustable independently of each other and can be varied during the displacement of the gripping devices to allow sliding of sections of the workpiece. A controller can be provided to change the gripping force or the holding force of the gripping device to control the individual gripping devices. The controller, for example, may communicate via a bus system with the individual gripping devices.

Advantageously, in a further process step the workpiece is placed in the deformed state in a workpiece carrier. It is advantageous if the deformed state of the workpiece corresponding to a target shape is defined by the workpiece carrier. In this way, the workpiece can be reproducibly and precisely placed in the workpiece carrier.

Specifically, the gripping devices are pivotally coupled to each other and when displaced they are pivoted against each other. The pivoting coupling of the gripping devices allows a lightweight construction of the holding device. The displacement by pivoting the gripping devices contributes to a uniform deformation of the workpiece.

In the displacement of the gripping devices especially those gripping devices are activated, which are displaced farthest, i.e. which perform a displacement on the longest displacement path.

Thus, these gripping devices introduce a force into the workpiece to be formed. The gripping devices are displaceable along a displacement path between a starting position and an end position. The starting position may correspond to the position of a gripping device in, for example, a flat initial configuration. The end position can correspond to a position of the gripping device in which all of the gripping devices form a contact surface adjusted or approximated to a target shape. The distance between the starting position and the end position of the gripping device represents the displacement path. The most displaced gripping devices are in contact with the said second sections of the workpiece.

The gripping devices are in particular changeable in their gripping force independently from each other. For this purpose, a controller may be provided for controlling the individual gripping devices. The controller can, for example, communicate via a bus system with the individual gripping devices. To that extent it is possible to provide specifically selected areas of the gripping surface of the holding device with a high or a low holding force. This allows taking a workpiece of, for example, a flat initial configuration and forming it into a desired shape by shifting the individual support elements. In order to let slide down certain areas along the whole formed gripping surface of the holding device, individual gripping devices can selectively be enabled and disabled. This allows avoiding local stress peaks in the flexible material.

BRIEF DESCRIPTION OF THE DRAWINGS

The invention is explained in more detail below with reference to figures. The figures show.

DETAILED DESCRIPTION OF THE INVENTION

Figure 1:
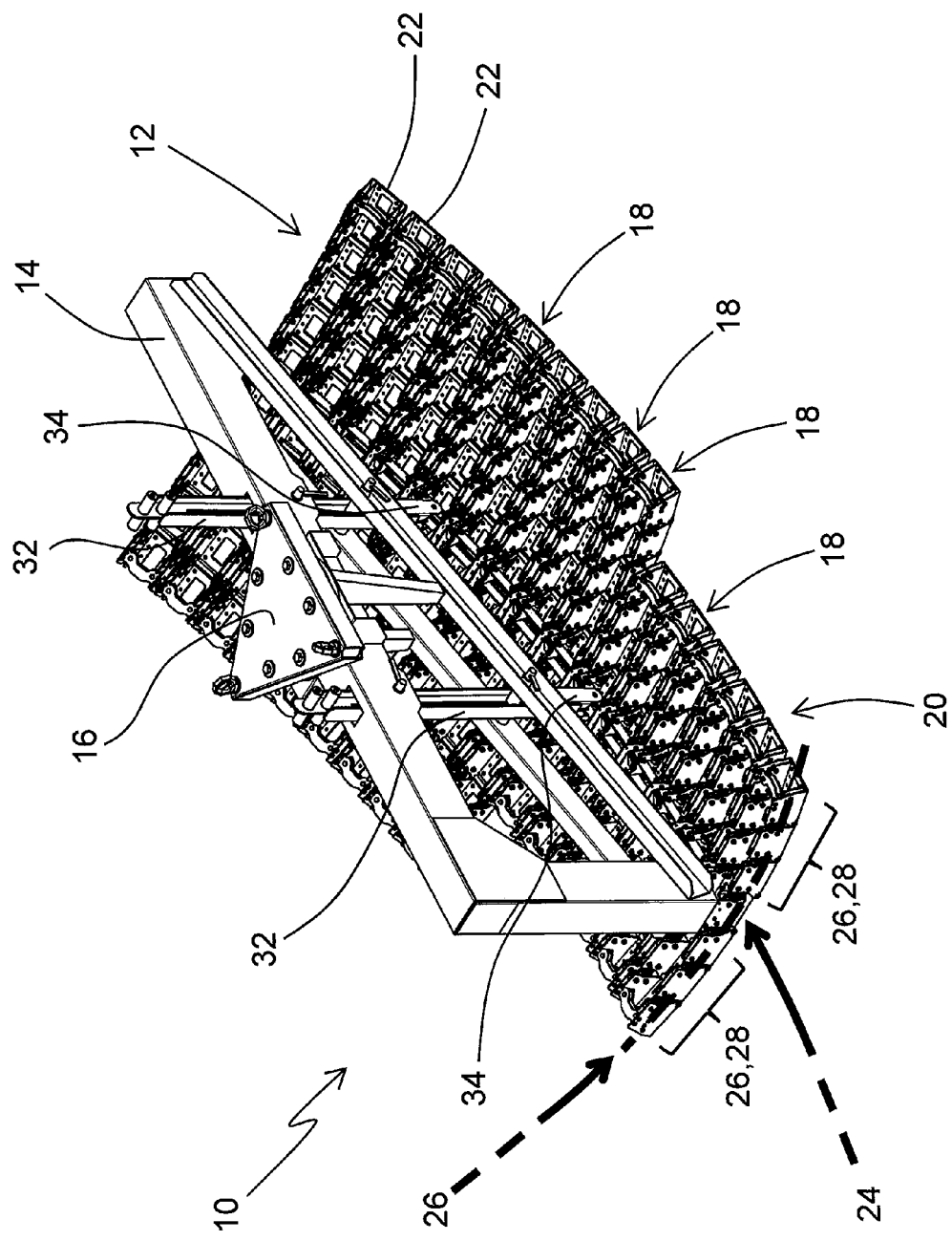
FIG. 1 is a perspective view of the holding device of the present invention.
Figure 2:
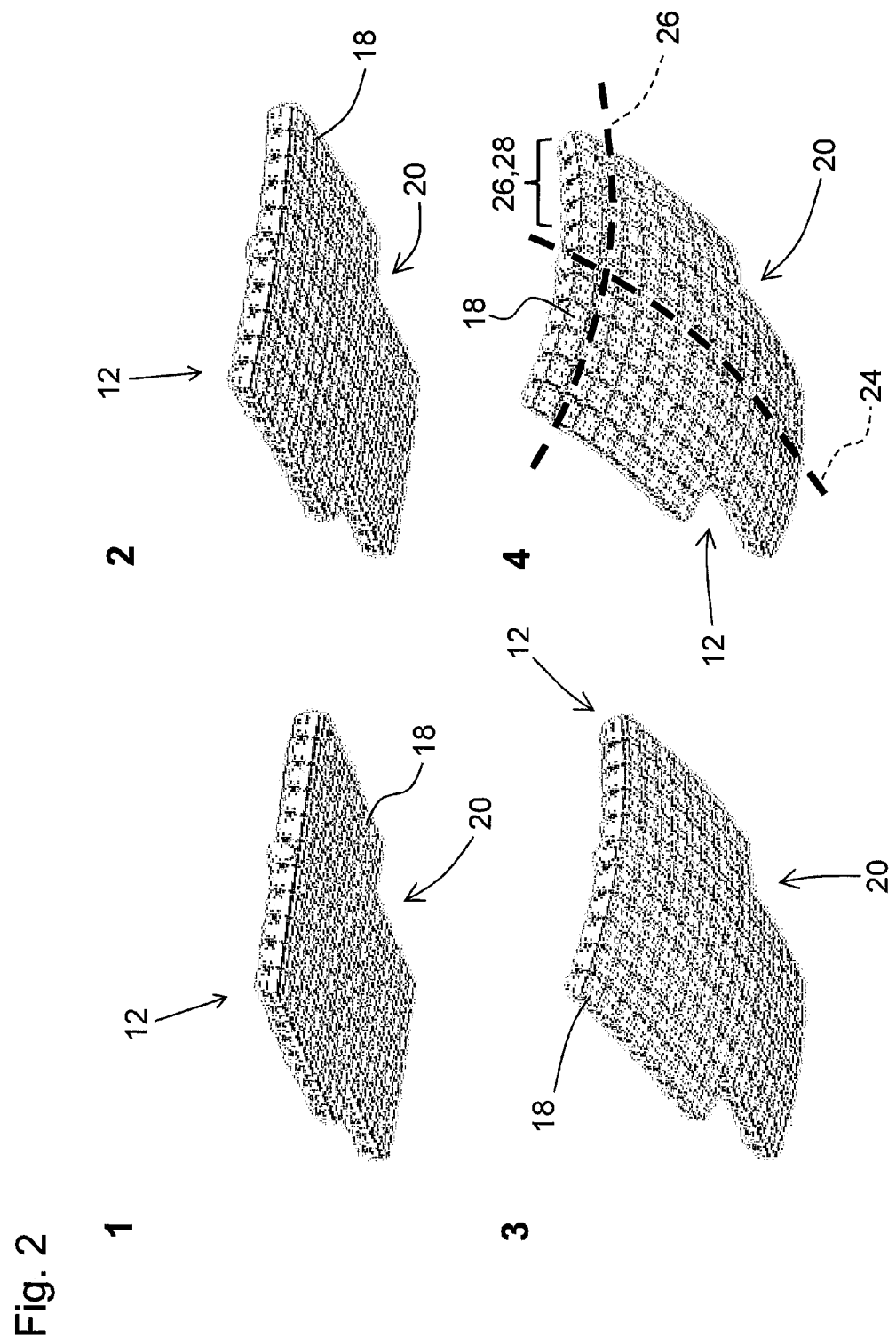
FIG. 2 is a perspective view of the whole formed gripping surface of the holding device according to FIG. 1 in various configurations.

The method of handling flexible mat-like workpieces is described using the example of a holding device 10 (see FIGS. 1 and 2). In the example shown, the holding device 10 comprises a modular support structure 12 which is supported by a framework 14. The framework 14 has for example a connecting section 16 for arrangement of the holding device 10 on a handling device, for example, on a robot arm or the like.

On the support structure 12 is provided a plurality of gripping devices 18, which are displaceable relative to each other. This displacement provides a gripping surface 20, which is spatially adaptable to a desired free-form surface, or contact surface 20 of the holding device 10.

The form-adjustable support structure 12 comprises a plurality of modular supporting elements 22, wherein in each supporting element 22 is arranged a gripping device 18 (not shown). The support elements 22 are connected to each other in a row like a chain, wherein different chains are formed, namely in the example shown a carrying chain 24 centrally extending through the whole formed gripping surface 20, and several formed ribbed chains 26 starting from the support elements 22 of the support chain 24. The ribbed chains 26 form ribbed arms 28 which extend from both sides of the support elements 22 of the support chain 24 substantially perpendicular to the carrying chain 24.

The support elements 22 of the support chain 24 are preferably interconnected by elastically resilient connecting elements. Thus, in an active movement of individual support elements 22 of the support chain 24, the respective adjacent support elements 22 are elastically entrained. Thus can be obtained a continuous shape of the support chain 24, and it requires only few actuators. For example, in FIG. 1 two actuators 32 are provided, each having an actuator piston 34 acting between the framework 14 and the support structure 12. Each of the actuator pistons 34 engages in an associated articulation point on the support chain 24. The pivot point is located for example on one of the selected support elements 22. By retraction and extension of the actuator piston 34, the respective support element is pushed away from the framework 14 or drawn to it. Because of the elastic connecting elements between the support elements 22 (not shown) the adjacent support elements 22 are continuously entrained.

FIG. 2 shows different views on the overall formed gripping surface 20 or contact surface 20 of the holding device 10. By displacing the individual gripping devices 18 relatively to one another, various vaulted and/or curved free-form surfaces are approximated by the gripping surface 20, that is, the gripping surface 20 can be adapted to various free-form surfaces.

The inventive method for handling flexible mat-like workpieces 30 can be designed with the holding device 10 and is explained with reference to FIGS. 3 and 4. By moving relative to each other, the gripping device 18 provides a contact surface 20 adjustable to a free-form surface.

Figure 3:
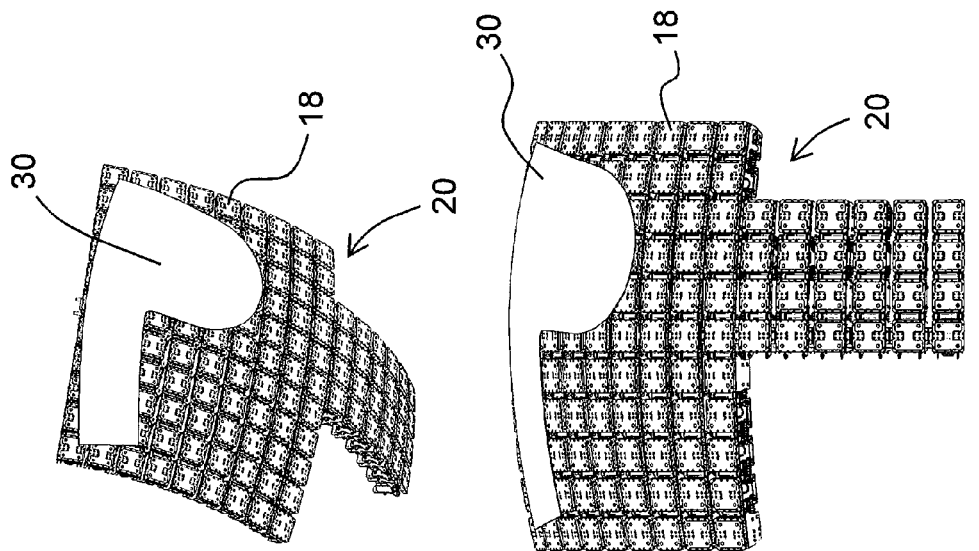
FIG. 3 is a perspective view of the gripping surface of a holding device in various configurations and with a held workpiece.
Figure 3:
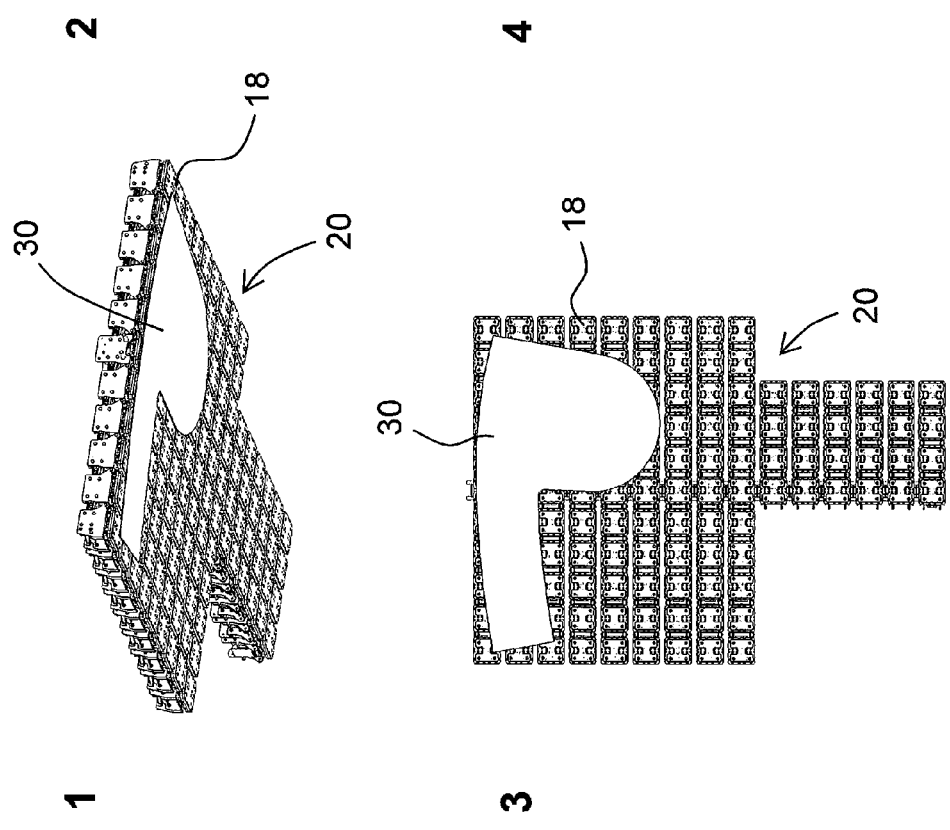

The workpiece 30 is taken from a flat initial configuration (see illustrations 1 and 2 in FIG. 3). The gripping devices 18 are at least partially activated.

Subsequently, the gripping devices 18 are moved relative to each other to form the workpiece 30 into a desired free-form (see illustrations 3 and 4 in FIG. 3). The gripping devices 18 are pivotally coupled to each other and are pivoted to shift.

Figure 4:
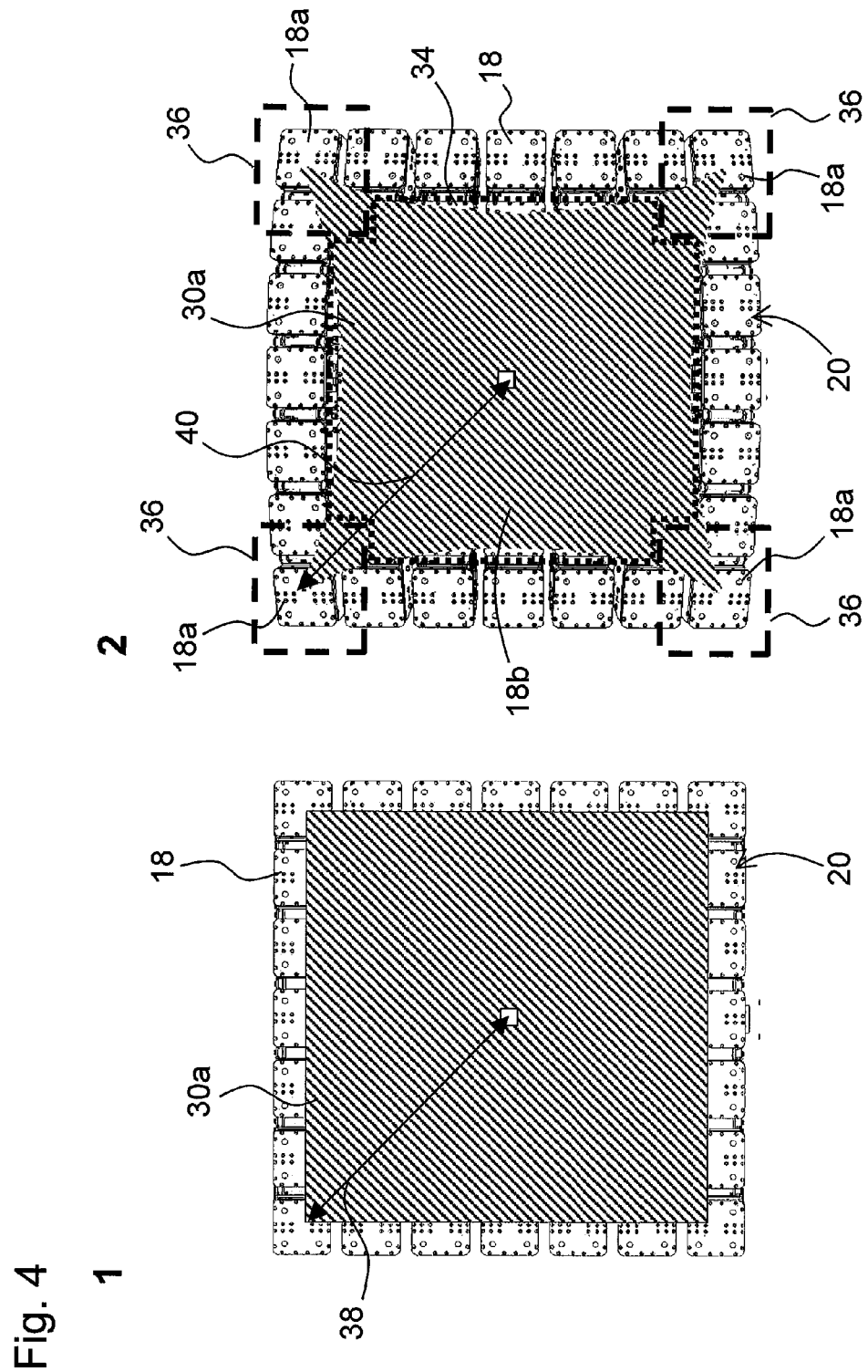
FIG. 4 is a top view of the gripping surface with the workpiece in various configurations.

Before or during the displacement of the gripping device 18, the holding force on individual gripping devices 18 is reduced such that the first sections 34 of the workpiece 30 slide at its deformation along the contact surface 20 and second sections 36 of the workpiece 30 are fixed by the gripping devices on the contact surface 20 (see illustration 2 in FIG. 4).

The gripping devices 18 are activated and deactivated independently from each other. In the present example, the gripping devices 18 are designed as vacuum suction.

The individual gripping devices 18 are each movable along a displacement path. With the displacement of the gripping devices 18, in particular those gripping devices 18 are enabled that are displaced farthest. The displacement path is the distance between a starting position, for instance in a flat configuration of the contact surface formed by the gripping device 20, and an end position in a configuration deformed to a target shape of the contact surface 20.

In FIG. 4 is shown the deformation of a rectangular workpiece 30. This may be a fiber mat. The gripping devices 18 have picked up the workpiece 30a in a flat initial configuration (FIG. 4, illustration 1). The gripping devices 18 are at least partially activated. The arrow 38 illustrates the distance between the center of the work piece 30a and a corner of the work piece 30a in the initial configuration.

Subsequently, a displacement of the gripping devices 18 takes place (FIG. 4, illustration 2). Here, those gripping devices 18 at least partially covered by the workpiece 30a are activated that are displaced farthest. In the example shown, these gripping devices 18a are at the corners of the workpiece 30a. The second sections 36 of the workpiece 30a are fixed by means of these gripping devices 18a against the contact surface 20. The second sections 36 are arranged in the corner regions of the workpiece 30a.

For the other gripping devices 18b, the holding force is reduced so that the first sections 34 of the workpiece 30a can slide when the workpiece is deformed along the contact surface 20. The first sections 34 may be those gripping devices 18b at least partially covered by the workpiece 30a, which are not arranged in the corners of the workpiece 30a. The arrow 40 illustrates the distance between the center of the work piece 30a and a corner of the workpiece 30a in the target configuration. The increase in length of the arrow 40 compared to the arrow 38 represents the displacement path of one of the selected gripping devices 18a.

The invention claimed is:

1. A method for handling of flexible and/or mat-like workpieces with a holding device comprising a plurality of gripping devices for exerting a holding force, wherein the plurality of gripping devices are provided on a support structure and are displaceable relatively to each other, wherein the plurality of gripping devices provide a contact surface that is adjustable to a free-form surface by displacement of the plurality of gripping devices relative to each other, the method comprising the following steps:
picking up the workpiece from an initial configuration with at least one gripping device activated from the plurality of gripping devices; and
displacing of the at least one gripping devices of the plurality of gripping devices relative to each other to deform the workpiece into a desired freeform,
wherein the holding force is reduced or inactivated at individual of the plurality of gripping devices before and/or during the displacement of the plurality of gripping devices, such that first sections of the workpiece during its deformation slide along the contact surface and second sections of the workpiece are fixed by means of the plurality of gripping devices on the contact surface.

2. The method according to claim 1, wherein for each of the plurality of gripping devices which abuts in the initial configuration to a respective contact section of the workpiece, the exerted holding force before and/or during the displacement is reduced in dependence on the length of the path, which the respective contact section travels by sliding along the contact surface during the deformation into the desired freeform.

3. The method according to claim 2, wherein the exerted holding force of the plurality of gripping devices abutting in its initial configuration to a contact section is reduced the more, the longer the desired path by which this contact section is to slide during the deformation.

4. The method according to claim 1, wherein the plurality of gripping devices are activated and deactivated independently of one another.

5. The method according to claim 1, wherein the workpiece is stored in the deformed state in a workpiece carrier.

6. The method according to claim 1, wherein the plurality of gripping devices are pivotally coupled to one another and are pivoted to be displaced relative to each other.

7. The method according to claim 1, wherein during the displacement of the plurality of gripping devices a selected one of the plurality of gripping devices is activated, and is displaced furthest.

* * * * *

UNITED STATES PATENT AND TRADEMARK OFFICE
CERTIFICATE OF CORRECTION

PATENT NO. : 9,925,670 B2
APPLICATION NO. : 14/727959
DATED : March 27, 2018
INVENTOR(S) : Thomas Eisele et al.

Page 1 of 1

It is certified that error appears in the above-identified patent and that said Letters Patent is hereby corrected as shown below:

Column 6, Line 10 (Claim 1) delete "by means of the" and insert therefor --by the--.

Signed and Sealed this
Twenty-fifth Day of September, 2018

Andrei Iancu
*Director of the United States Patent and Trademark Office*